United States Patent [19]

Kubitza et al.

[11] 4,456,658

[45] Jun. 26, 1984

[54] USE OF CLEAR COATING BASED ON ORGANIC POLYISOCYANATES FOR COATING SHEET PRODUCTS BASED ON POLYVINYL CHLORIDE

[75] Inventors: Werner Kubitza; Gerhard Mennicken, both of Leverkusen, Fed. Rep. of Germany

[73] Assignee: Bayer Aktiengesellschaft, Leverkusen, Fed. Rep. of Germany

[21] Appl. No.: 457,104

[22] Filed: Jan. 10, 1983

[30] Foreign Application Priority Data

Jan. 23, 1982 [DE] Fed. Rep. of Germany ....... 3202166

[51] Int. Cl.$^3$ ...................... B32B 27/08; B32B 27/30; C08G 18/10
[52] U.S. Cl. ................................ 428/424.6; 428/522; 528/59; 528/73
[58] Field of Search .............. 428/424.6, 422.8, 319.3, 428/319.7, 522; 528/59, 73

[56] References Cited

U.S. PATENT DOCUMENTS

| | | | |
|---|---|---|---|
| 4,118,376 | 10/1978 | Pedain et al. | 528/73 |
| 4,124,569 | 11/1978 | Bock et al. | 528/59 |
| 4,206,255 | 1/1980 | Wenzel et al. | 428/424.6 |
| 4,292,350 | 9/1981 | Kubitza et al. | 427/385.5 |
| 4,399,182 | 8/1983 | Brown et al. | 428/424.6 |
| 4,404,258 | 9/1983 | Loewrigkeit et al. | 428/424.6 |
| 4,413,111 | 11/1983 | Markusch et al. | 528/59 |

*Primary Examiner*—William J. Van Balen
*Attorney, Agent, or Firm*—Gene Harsh; Joseph C. Gil; Thomas W. Roy

[57] ABSTRACT

The present invention relates to a process for coating polyvinyl chloride sheet products, optionally containing plasticizers, with clear coatings which can be hardened under the influence of atmospheric moisture and have a viscosity at 23° C. of from about 60 to 2500 mPa.s, and which contain (a) at least one polyisocyanate which is liquid at room temperature, (b) up to about 15% by weight, based on the coating of solvents, and optionally (c) conventional auxiliary agents and additives, and to the coated products produced therefrom.

5 Claims, No Drawings

USE OF CLEAR COATING BASED ON ORGANIC POLYISOCYANATES FOR COATING SHEET PRODUCTS BASED ON POLYVINYL CHLORIDE

BACKGROUND OF THE INVENTION

1. Field of the Invention

The present invention relates to the use of a novel clear coating based on organic polyisocyanates which are liquid at room temperature for the coating of sheet products based on polyvinyl chloride.

2. Description of the Prior Art

The coating of sheet products based on PVC, for example floor coverings or wall coverings of plasticized PVC, for protection against the action of chemicals or abrasion, is already known. The clear coatings hitherto used for this purpose include inter alia solvent-containing coatings in which the binders are based on polyacrylates or linear polyurethane polyureas. Owing to the generally high molecular weight of these binders, they require the use of large quantities of organic solvents. Furthermore, coatings prepared from such physically drying systems do not have sufficient resistance to organic substances which have a dissolving action. The usual two-component polyurethane coatings based on higher functional polyisocyanates and suitable hydroxy functional reactants have already been used for the coating of PVC. The advantage of these coating compounds lies in their distinctly better resistance to chemicals and solvents compared with that of the above-mentioned physically drying coating compounds, but they have the disadvantage that the addition of high proportions of organic solvents is an essential requirement as well as the disadvantage common to all two-component systems of having only a limited working time.

It has now surprisingly been found that the coating compounds according to the invention described below, consisting mainly of certain polyisocyanates which are liquid at room temperature, are eminently suitable as clear coatings for sheet products based on PVC. This observation is also surprising in view of the teaching given in German Offenlegungsschrift No. 2,845,514 since according to this prior publication the binders used for one-component systems must consist of mixtures of polyisocyanates with certain monoisocyanates and since the prior publication makes no comment on the particular suitability of the mixtures described therein for the coating of PVC.

SUMMARY OF THE INVENTION

The present invention is directed to a process for coating polyvinyl chloride sheet products which comprises
  (a) coating the sheet products with a clear coating
    (i) capable of hardening under the influence of atmospheric moisture
    (ii) having a viscosity at 23° C. of from about 60 to 2500 mPa.s,
    (iii) containing up to about 15% by weight, based on the weight of the coating, of solvents which are inert towards isocyanate groups and
    (iv) wherein the binder of said coating consists essentially of at least one polyisocyanate which is liquid at room temperature. The present invention is also directed to the coated sheet products produced according to the above process.

DETAILED DESCRIPTION OF THE INVENTION

The clear coatings to be used according to the invention have a viscosity at 23° C. of from about 60 to 2500 mPa.s, preferably from 100 to 1000 mPa.s. Since the clear coatings to be used according to the invention are preferably solvent-free systems, the polyisocyanate component present as main component in the clear coatings preferably also conforms to these viscosity conditions.

The binder of the clear coatings to be used according to the invention are "polyisocyanates", i.e. in particular polyisocyanates containing biuret or isocyanurate groups and optionally uretdione groups and having an average isocyanate functionality above 2, preferably from about 2.5 to 6. These "polyisocyanates" preferably have aromatically, cycloaliphatically or aliphatically bound isocyanate groups. Polyisocyanates having aliphatically and/or cycloaliphatically bound isocyanate groups are preferred for lightfast coatings. The polyisocyanates are prepared by the known modification of simple organic diisocyanates resulting in the formation of biuret or isocyanurate groups or the simultaneous formation of isocyanurate and uretdione groups, any excess of unmodified monomeric starting isocyanate still present after the modification reaction being removed in known manner, preferably by distillation, so that the polyisocyanates to be used according to the invention contain at the most 0.7% by weight, preferably not more than about 0.5% by weight of excess diisocyanate. The polyisocyanates to be used according to the invention generally have an isocyanate content, based on the solid content, in the range of about 10 to 30% by weight and are liquids at room temperature, preferably conforming to the viscosity conditions mentioned above.

Suitable diisocyanates for the preparation of the polyisocyanates include, for example, 2,4- and/or 2,6-diisocyanatotoluene, 2,4'-diisocyanato-dicyclohexylmethane, 4,4'-diisocyanato-dicyclohexylmethane, hexamethylene diisocyanate and 1-isocyanato-3,3,5-trimethyl-5-isocyanatomethyl-cyclohexane (IPDI). The polyisocyanates may, of course, also be prepared from mixtures of these diisocyanates. Hexamethylenediisocyanate is the preferred starting material for the preparation of the binder to be used according to the invention. Tris-(isocyanatohexyl)-biuret, tris-(isocyanatohexyl)-isocyanurate, mixtures of these modified polyisocyanates with their higher homologues or the mixtures of tris-(isocyanatohexyl)-isocyanurate and bis-(isocyanatohexyl)-uretdione which are obtainable by phosphine catalyzed oligomerization of hexamethylene diisocyanate accordingly constitute the preferred polyisocyanates to be used as the polyisocyanate binder.

The clear coatings to be used according to the invention may, if necessary, contain small quantities of isocyanate inert solvents, preferably in quantities of up to about 15% by weight based on the whole mixture, for the purpose of adjusting their viscosity. Examples of such solvents include butyl acetate, methyl ethyl ketone, methyl isobutyl ketone, ethoxyethylacetate, toluene, xylene and mixtures of such solvents, but the clear lacquers to be used according to the invention are preferably solvent-free systems.

In addition to the above-mentioned components, the clear coatings to be used according to the invention may also contain other isocyanate inert auxiliary agents and additives conventionally used in clear coatings based on polyisocyanates. These auxiliary agents and additives may include, for example, levelling agents, catalysts for the isocyanate-water reaction, in particular organic tin compounds of known type such as dibutyl tin dilaurate, and plasticizer oils or resins for increasing the elasticity.

The clear coatings are used according to the invention for coating sheet products based on polyvinyl chloride. By "polyvinyl chloride" is meant in this context not only the pure vinyl chloride homopolymer but also the known graft polymers of vinyl chloride obtained, for example, from ethylene-vinyl ester copolymers used as graft basis, or the known copolymers of vinyl chloride, for example with vinylidene chloride, the graft polymers or copolymers generally containing at least about 50% by weight of vinyl chloride which has been incorporated by polymerization. The sheet products to be coated according to the invention preferably contain polymers of the type mentioned above to which additionally contain from about 5 to 30% by weight, preferably from about 10 to 30% by weight of conventional PVC plasticizers. Examples of such plasticizers include $C_{10}$–$C_{18}$–alkane sulphonic acid esters of phenol or cresol; dialkylphthalates having 1 to 10 carbon atoms in the alkyl group, such as dimethyl-, dioctyl- or dodecylphthalate; and PVC plasticizers such as dicyclohexylphthalate, trichloroethylphosphate, triphenylphosphate, diphenylcresyl phosphate or adipic acid-benzyloctyl esters, or polymeric plasticizers based on polyadipates. The sheet products may, of course, also contain the usual additives such as fillers, pigments, stabilizers and the like.

The clear coatings to be used according to the invention may be applied by the usual methods, e.g. spread coating, roller application or spraying or for continuous industrial processes, they may be applied with doctor kiss coaters or rollers. The clear coatings are generally used in quantities corresponding to a dry film thickness of from about 0.01 to 0.5 mm.

The clear coatings to be used according to the invention are stable in storage when atmospheric moisture is excluded and they harden under the influence of moisture to form tough elastic films and coatings. The moisture necessary for the reaction may be available as atmospheric moisture although moisture may also be supplied artificially as steam, for example in continuous processing plants. Hardening of the coatings obtained from the use according to the invention is preferably carried out at room temperature, but it may also be conducted at elevated temperatures, for example at about 150–180° C., within a few minutes.

According to the invention, it is particularly advantageous to cover floor coverings or wall coverings based on PVC with the chemically resistant and temperature resistant coating according to the invention which is highly flexible and abrasion resistant.

The following polyisocyanates were used in the Examples which follow:

Polyisocyanate A

A biuret polyisocyanate mixture primarily containing tris-(isocyanatohexyl)-biuret and prepared by the biuretization of hexamethylene diisocyanate according to U.S. Pat. No. 3,903,127, followed by removal of excess hexamethylene diisocyanate by distillation. Isocyanate content=23.5% by weight, free hexamethylene diisocyanate content=0.7% by weight, average isocyanate functionality > 3, viscosity about 2400 mPa.s/23° C.

Polyisocyanate B

Mixture of tris-(isocyanatohexyl)-isocyanurate and bis-(isocyanatohexyl)-uretdione prepared by phosphine-catalyzed oligomerization of hexamethylene diisocyanate followed by removal of excess hexamethylene diisocyanate by distillation. Isocyanate content=22.5% by weight, hexamethylene diisocyanate content<0.7% by weight, average isocyanate functionality about 3, viscosity about 150 mPa.s/23° C.

EXAMPLES

EXAMPLE 1

100 Parts by weight of polyisocyanate B were mixed with 0.3 parts by weight of dibutyl tin dilaurate as catalyst and 0.06% of a commercial silicone oil (Siliconöl PL, BAYER AG, Leverkusen) as levelling agent. The clear formulation obtained has virtually unlimited stability in storage in the absence of moisture and has a viscosity of about 100 mPa.s/23° C. When applied by roller to form a layer 0.04 mm in thickness on PVC floor coverings containing (a) 70 parts by weight of PVC micro bead polymer, 29 parts by weight of benzyl butyl phthalate and 1 part by weight of zinc stabilizer and (b) 17 parts by weight of emulsion PVC, 13 parts by weight of plasticizer based on $C_1$–$C_{20}$–alkane sulphonic acid esters of phenol, 70 parts by weight of calcium carbonate (filler), 1 part by weight of titanium dioxide and 0.5 parts by weight of diphenylthiourea, the coatings dried to a dust-free state within 2 to 3 hours at room temperature and to a non-marring state within 5 to 7 hours at room temperature and when dried overnight at room temperature they could be walked on. The surfaces of the dried films have a silky gloss and were distinguished by their adherence to the PVC plastics, their resistance to chemicals and solvents and their flexibility and abrasion resistance. The abrasion values obtained in the Taber abrader were below 20 mg at 1000 revolutions, using a CS 10 grinding roller under a load of 1 kg per roller.

EXAMPLE 2

The formulation according to Example 1 was applied to form a layer about 0.04 mm in thickness on the PVC flooring materials according to Example 1 and stoved for about 3 minutes at 150° C. immediately after application. An adequate supply of moisture was provided by setting up water dishes in the stoving apparatus. After the stoving time indicated above and brief cooling, the surfaces were tack-free and could be rolled up. The films have a surface with a silky gloss and in their mechanical properties they correspond to the coverings according to Example 1.

EXAMPLE 3

A mixture of 50 parts by weight of polyisocyanate B and 50 parts by weight of polyisocyanate A, 0.6 parts by weight of dibutyl tin dilaurate and 0.06 parts by weight of the silicone oil from Example 1 gave rise to a clear formulation which has virtually unlimited stability in storage in the absence of moisture and has a viscosity of 360 mPa.s/23° C. After application to the PVC flooring materials according to Example 1 in layers having a thickness of 0.4 mm, the coatings formed glossy, firmly adherent and abrasion resistant films when dried overnight at room temperature. Abrasion in the Taber abrader under the conditions indicated in Example 1 was also below 20 mg.

EXAMPLE 4

100 Parts by weight of polyisocyanate B were mixed with 15 parts by weight of a commercial polyester-based soft resin which was free from hydroxyl groups (P 65 of BAYER AG, Leverkusen), and 0.3 parts by weight of dibutyl tin dilaurate and 0.06 parts by weight of the silicone oil from Example 1 were then added. A formulation which has unlimited stability in storage in the absence of moisture and a viscosity of 240 mPa.s/23° C. was obtained. After application of the clear formulation to the PVC flooring materials of Example 1 to form layers 0.04 mm in thickness, films with a silky gloss were obtained when dried at room temperature as in Example 1 and at elevated temperature as in Example 2. Flexible coatings with excellent abrasion values were obtained in each case.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for coating polyvinyl chloride sheet products which comprises coating said sheet products with a clear coating
   (i) capable of hardening by reacting with atmospheric moisture,
   (ii) having a viscosity at 23° C. of from about 60 to 2500 mPa.s,
   (iii) containing up to about 15% by weight, based on the weight of said coating, of solvents which are inert towards isocyanate groups and
   (iv) wherein the binder of said coating consists essentially of at least one polyisocyanate which is liquid at room temperature.

2. The process of claim 1 wherein said coating additionally contains auxiliary agents and additives which are inert towards isocyanate groups.

3. The process of claim 2 wherein said coating has a viscosity at 23° C. of from about 100 to 1000 mPa.s.

4. The process of claim 2 wherein said sheet products are based on a homopolymer, graft polymer or copolymer of vinyl chloride containing at least about 50% by weight of vinyl chloride incorporated by polymerization and containing from about 5 to 30% by weight, based on the polymer, of a plasticizer.

5. The coated sheet product produced in accordance with claim 2.

* * * * *